(12) United States Patent
Nasrabadi et al.

(10) Patent No.: US 11,972,630 B2
(45) Date of Patent: Apr. 30, 2024

(54) CROSS-MATCHING CONTACTLESS FINGERPRINTS AGAINST LEGACY CONTACT-BASED FINGERPRINTS

(71) Applicant: West Virginia University, Morgantown, WV (US)

(72) Inventors: Nasser M. Nasrabadi, Morgantown, WV (US); Jeremy M. Dawson, Fairmont, WV (US); Ali Dabouei, Morgantown, WV (US)

(73) Assignee: WEST VIRGINIA UNIVERSITY, Morgantown, WV (US)

(*) Notice: Subject to any disclaimer, the term of this patent is extended or adjusted under 35 U.S.C. 154(b) by 40 days.

(21) Appl. No.: 17/616,040

(22) PCT Filed: Jun. 3, 2020

(86) PCT No.: PCT/US2020/035918
§ 371 (c)(1),
(2) Date: Dec. 2, 2021

(87) PCT Pub. No.: WO2020/247494
PCT Pub. Date: Dec. 10, 2020

(65) Prior Publication Data
US 2022/0301338 A1  Sep. 22, 2022

Related U.S. Application Data

(60) Provisional application No. 62/856,308, filed on Jun. 3, 2019.

(51) Int. Cl.
*G06V 40/12* (2022.01)
*G06V 10/772* (2022.01)
*G06V 10/82* (2022.01)

(52) U.S. Cl.
CPC ........ *G06V 40/1347* (2022.01); *G06V 10/772* (2022.01); *G06V 10/82* (2022.01)

(58) Field of Classification Search
CPC ... G06V 40/1347; G06V 10/772; G06V 10/82
See application file for complete search history.

(56) References Cited

U.S. PATENT DOCUMENTS 9,710,691 B1 * 7/2017 Hatcher ............. G06V 40/1353
11,048,910 B2 * 6/2021 Li ....................... G06V 40/1312
(Continued)

OTHER PUBLICATIONS

Dabouei, et al., "Deep Contacless Fingerpring Unwarping", ResearchGate, Apr. 2019.
(Continued)

*Primary Examiner* — Lixi C Simpson
(74) *Attorney, Agent, or Firm* — Thomas | Horstemeyer, LLP (57) ABSTRACT

Various examples are provided for distortion rectification and fingerprint crossmatching. In one example, a method includes selecting an electronic, perspective distorted fingerprint sample; and generating an unwarped fingerprint sample by rectifying perspective distortions from the perspective distorted fingerprint sample by application of an unwarping transformation. Parameters of the unwarping transformation can be determined by a deep convolutional neural network (DCNN) trained on a database comprising contactless fingerprint samples suffering from perspective distortions. In another example, a system comprises processing circuitry that can: identify warp parameters associated with a contactless fingerprint sample, the warp parameters estimated from the contactless fingerprint sample by a DCNN trained on a database comprising contactless fingerprint samples suffering from perspective distortions; and generate an unwarped fingerprint sample from the contactless fingerprint sample, the unwarped fingerprint sample (Continued)

generated using an unwarping transformation based upon the identified warp parameters.

20 Claims, 9 Drawing Sheets

(56) References Cited

U.S. PATENT DOCUMENTS

| | | | |
|---|---|---|---|
| 2010/0119158 A1* | 5/2010 | Dalal | G06V 10/243 |
| | | | 382/275 |
| 2011/0064282 A1 | 3/2011 | Abramovich et al. | |
| 2014/0044323 A1 | 2/2014 | Abramovich et al. | |
| 2018/0165508 A1* | 6/2018 | Othman | G06V 40/1353 |
| 2019/0156106 A1* | 5/2019 | Schroff | G06F 18/21347 |

OTHER PUBLICATIONS

International Search Report for PCT/US20/35918 dated Aug. 18, 2020.

* cited by examiner

FIG. 1

FIG. 2 a) Warp Estimator

| #L | T | KS | OS |
|---|---|---|---|
| 1 | C,B,R,M | 32 | 128, 32 |
| 2 | C,B,R,M | 64 | 64, 64 |
| 3 | C,B,R,M | 64 | 32, 64 |
| 4 | C,B,R,M | 128 | 16, 128 |
| 5 | C,B,R,M | 256 | 8, 256 |
| 6 | C,B,R,M | 512 | 4, 512 |
| 7 | C,B,R,M | 1024 | 2, 1024 |
| 8 | C,B,R,M | 2048 | 1, 2048 |
| 9 | F,B,R | 1024 | 1, 1024 |
| 10 | F | $1, N_o$ | $1, N_o$ | b) Rige Enhancer

| #L | T | S | KS | OS | #L | T | S | KS | OS | Cn |
|---|---|---|---|---|---|---|---|---|---|---|
| 1 | V | 1 | 64 | 256, 64 | 10 | V | 1 | 512 | 16, 512 | - |
| 2 | V | 2 | 128 | 128, 128 | 11 | D | 2 | 512 | 32, 512 | L7 |
| 3 | V | 1 | 128 | 128, 128 | 12 | V | 1 | 512 | 32, 512 | - |
| 4 | V | 2 | 256 | 64, 256 | 13 | D | 2 | 256 | 64, 256 | L5 |
| 5 | V | 1 | 256 | 64, 256 | 14 | V | 1 | 256 | 64, 256 | - |
| 6 | V | 2 | 512 | 32, 512 | 15 | D | 2 | 128 | 128, 128 | L3 |
| 7 | V | 1 | 512 | 32, 512 | 16 | V | 1 | 128 | 128, 128 | - |
| 8 | V | 2 | 512 | 16, 512 | 17 | D | 2 | 64 | 256, 64 | L1 |
| 9 | V | 1 | 512 | 16, 512 | 18 | V | 1 | 4 | 256, 2 | - |

| Exp. # | Method | Equal Error Rate (%) | Rank-1 (%) | Rank-5 (%) | Rank-10 (%) |
|---|---|---|---|---|---|
| 1 | NIST-NBIS [13] | 37.66 | 32.20 | 38.22 | 41.89 |
| 2 | MCC [5] | 32.10 | 35.84 | 41.90 | 45.03 |
| 3 | VeriFinger [20] | 25.32 | 35.13 | 44.40 | 47.70 |
| 4 | Approximating TPS [2] | 26.83 | 21.59 | 31.93 | 38.00 |
| 5 | DeepDFR [7] | 21.34 | 36.41 | 47.95 | 53.11 |
| 6 | RTPS+DCM [17] | 19.81 | 36.25 | 47.34 | 54.01 |
| 7 | CNN-LZ [16] | 8.38 | 56.08 | 70.17 | 78.04 |
| 8 | Model A: PCA w/o ScoreMap | 16.25 | 46.80 | 58.76 | 68.10 |
| 9 | Model B: FGrid w/o ScoreMap | 8.90 | 54.32 | 67.43 | 75.90 |
| 10 | Model C: PCA w/ ScoreMap | 11.16 | 48.20 | 63.09 | 70.84 |
| 11 | Model D: FGrid w/ ScoreMap | 7.71 | 61.01 | 73.82 | 80.88 |

[13] K. Ko. User's guide to NIST biometric image software (NBIS). Technical report, 2007.

[5] R. Cappelli, M. Ferrara, and D. Maltoni. Minutia cylinder-code: A new representation and matching technique for fingerprint recognition. IEEE Transactions on Pattern Analysis and Machine Intelligence, 32(12):2128–2141, 2010.

[20] Neurotechnology Inc., Verifinger. http://www.neurotechnology.com.

[2] A. M. Bazen and S. H. Gerez. Fingerprint matching by thin-plate spline modelling of elastic deformations. Pattern Recognition, 36(8):1859–1867, 2003.

[7] A. Dabouei, H. Kazemi, S. Iranmanesh, J. Dawson, and N. Nasrabadi. Fingerprint distortion rectification using deep convolutional neural networks. In The 11th IAPR International Conference on Biometrics (ICB 2018), 2018.

[17] C. Lin and A. Kumar. Matching contactless and contact-based conventional fingerprint images for biometrics identification. IEEE Transactions on Image Processing, 27(4):2008–2021, 2018.

[16] C. Lin and A. Kumar. Multi-siamese networks to accurately match contactless to contact-based fingerprint images. In Biometrics (IJCB), 2017 IEEE International Joint Conference on, pages 277–285. IEEE, 2017.

|  | NBIS | VeriFinger |
|---|---|---|
| Original | 36.74 | 38.20 |
| Unwarped-Model A | 40.85 | 41.04 |
| Unwarped-Model B | 42.43 | 43.22 |
| Unwarped-Model C | 41.54 | 42.37 |
| Unwarped-Model D | 43.81 | 44.58 |

FIG. 9

FIG. 10

CROSS-MATCHING CONTACTLESS FINGERPRINTS AGAINST LEGACY CONTACT-BASED FINGERPRINTS

CROSS-REFERENCE TO RELATED APPLICATIONS

This application is a national stage entry pursuant to 35 U.S.C. § 371 of Patent Cooperation Treaty (PCT) international application No. PCT/US2020/035918, filed on Jun. 3, 2020, which claims priority to, and the benefit of the filing date of, U.S. provisional application No. 62/856,308, filed on Jun. 3, 2019, entitled "CROSS-MATCHING CONTACTLESS FINGERPRINTS AGAINST LEGACY CONTACT-BASED FINGERPRINTS" which are all hereby incorporated herein by reference in their entireties.

STATEMENT REGARDING FEDERALLY SPONSORED RESEARCH OR DEVELOPMENT

This invention was made with government support under 1650474 awarded by the National Science Foundation. The Government has certain rights in the invention.

BACKGROUND

Cross-matching contactless fingerprints (finger-photo) to legacy contact-based fingerprints (rolled-fingerprints) is a challenging task due to the perspective and elastic distortions of the two modalities. All contact-based fingerprints contain some level of distortion (deformation of skin caused by the action of touching the surface collecting the fingerprint) and, similarly, all contactless fingerprints suffer from some level of perspective distortion introduced by the three-dimensional geometry of the finger. Perspective distortion severely alters the range of the ridge frequencies. Consequently, classical ridge enhancement methods fail to reconstruct the whole ridge map. The two distortions can lead to misidentification when automated matching methods are performed between two fingerprints to an individual when captured with a contact-based and contactless fingerprint capturing devices. This misidentification rate can become a significant issue if the database contains fingerprints from millions of individuals.

SUMMARY

Contactless fingerprints have emerged as a convenient, inexpensive, and hygienic way of capturing fingerprint samples. However, cross-matching contactless fingerprints to contact-based fingerprints is a challenging task due to the elastic and perspective distortion of the two modalities. Current cross-matching methods merely rectify the contact-based samples to reduce the geometric mismatch and ignore the perspective distortion of contactless fingerprints. Adopting classical deformation correction techniques to compensate for the perspective distortion needs a large number of minutiae-annotated contactless fingerprints. However, annotating minutiae of contactless samples is a labor intensive and inaccurate task especially for regions which are far from the center of the finger. Aspects of the present disclosure are related to contactless fingerprints, which can be cross-matched to contact-based fingerprints such as those acquired with legacy system.

In one aspect, among others, a method for rectifying contactless fingerprint perspective distortion, comprises selecting an electronic, perspective distorted fingerprint sample; and generating an unwarped fingerprint sample by rectifying perspective distortions from the electronic, perspective distorted fingerprint sample by application of an unwarping transformation. Parameters of the unwarping transformation can be determined by a deep convolutional neural network (DCNN) trained on a database comprising contactless fingerprint samples suffering from perspective distortions. The database can comprise contact-based fingerprint samples suffering from geometric distortion, with at least one contact-based fingerprint sample corresponding to individual ones of the contactless fingerprint samples. The DCNN can be trained on the contactless fingerprint samples and the corresponding contact-based fingerprint samples. The DCNN can be trained to determine the parameters of the unwarping transform based upon a PCA-constrained model of warp or based upon a free grid model of warp. The unwarping transformation can be a thin plate spline (TPS) transformation.

In one or more aspects, the method can comprise generating a warp score map corresponding to the unwarped fingerprint sample, the warp score map indicating an amount of warp at each source location of the electronic, perspective distorted fingerprint sample. In various aspects, the method can comprise generating an enhanced ridge map from the unwarped fingerprint sample, the enhanced ridge map generated utilizing a convolutional neural network (CNN) based ridge enhancer. The method can comprise identifying a relationship between the electronic, perspective distorted fingerprint sample and a contact-based fingerprint based upon a comparison of the enhanced ridge map with the contact-based fingerprint. The method can comprise determining a reconstruction loss associated with the enhanced ridge map based upon comparison of the enhanced ridge map and a ground truth ridge map associated with a contact-based fingerprint corresponding to the electronic, perspective distorted fingerprint sample.

In some aspects, the reconstruction loss can provide for supervised training of the DCNN for determining the parameters of the unwarping transformation. The reconstruction loss can be weighted based upon a warp score map corresponding to the unwarped fingerprint sample, the warp score map indicating an amount of warp at each source location of the electronic, perspective distorted fingerprint sample. The reconstruction loss can be weighted based upon a masked score map generated from the warp score map based upon a ground truth map of the corresponding contact-based fingerprint. One source of the perspective distortions can result from a touchless camera photograph of a fingerprint.

In another aspect, a system comprises processing circuitry comprising a processor and memory; and a fingerprint unwarping and ridge enhancement application executable by the processing circuitry. Execution of the fingerprint unwarping and ridge enhancement application can cause the processing circuitry to: identify warp parameters associated with a contactless fingerprint sample, the warp parameters estimated from the contactless fingerprint sample by a deep convolutional neural network (DCNN) trained on a database comprising contactless fingerprint samples suffering from perspective distortions; and generate an unwarped fingerprint sample from the contactless fingerprint sample, the unwarped fingerprint sample generated using an unwarping transformation based upon the identified warp parameters. The warp parameters can be PCA-constrained warp parameters ($\Theta^{PCA}$) or free grid warp parameters ($\Theta^{FG}$). The unwarping transformation can be a thin plate spline (TPS) transformation. In various aspects, the distortion rectification application can cause the processing circuitry to generate an enhanced ridge map from the unwarped fingerprint sample utilizing a convolutional neural network (CNN) based ridge enhancer. Supervised training of the DCNN can be provided based upon a reconstruction loss based upon comparison of the enhanced ridge map and a ground truth ridge map associated with a contact-based fingerprint corresponding to the contactless fingerprint sample. The reconstruction loss can be weighted based upon a warp score map corresponding to the unwarped fingerprint sample, the warp score map indicating an amount of warp at each source location of the contactless fingerprint sample. The contactless fingerprint can be obtained by the system via an imaging device.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 6 is a table illustrating ROC and CMC results for the cross-matching experiments, in accordance with various embodiments of the present disclosure.

DETAILED DESCRIPTION

Disclosed herein are various examples related to cross-matching contactless fingerprints against contact-based fingerprints. A joint optimization technique is disclosed that can provide indirect supervision for training a deep model for rectifying perspective distortion of contactless fingerprints. Intensive experiments using two public datasets of contactless fingerprints show that the proposed unwarping approach, on average, can results in a 17% increase in the number of detectable minutiae from contactless fingerprints. Consequently, the disclosed model can achieve an equal error rate of 10.64%, and Rank-1 accuracy of 49.20% on the challenging dataset of two-dimensional and/or three-dimensional (2D/3D) fingerprints. Reference will now be made in detail to the description of the embodiments as illustrated in the drawings, wherein like reference numbers indicate like parts throughout the several views.

During the past two decades, the intensive adoption of fingerprint-based identification methods has shown the dominant properties of fingerprints over other biometric modalities. The random nature of the type and location of features, especially minutiae, in a fingerprint provides reliable and highly discriminative information for the identification task. Desirably, the number of these features within a single fingerprint is large enough that even a partial latent fingerprint collected from a crime scene may be used to identify an individual. On the other hand, capturing fingerprints is fast, easy and cheap. The convenience of capturing fingerprints has further been improved by utilizing contactless fingerprint devices and developing appropriate recognition techniques. These methods are adopted for either a dedicated capturing hardware or existing devices such as mobile phones. Using ordinary cameras to capture contactless fingerprint samples has drawn increasing attention in recent years, mainly because of three reasons. First, it is cheaper to incorporate an existing host device to capture samples. Second, contactless technologies are much more hygienic than touch-based systems. The recent emergence of the novel coronavirus and the associated pandemic will be a major market driver for hygienic fingerprint capture. Third, the contactless fingerprint recognition algorithm can be incorporated as an authentication unit on the host device itself. Table 1 lists several commercial fingerprinting systems that would benefit from the technology described herein.

TABLE 1

Representative commercially available contactless fingerprint devices

| Manufacturer | Model | Form Factor | No. of Fingers Captured |
| --- | --- | --- | --- |
| Idemia | MorphoWave | Desktop & Kiosk | 4 |
| Gemalto Cogent/Thales | CID 1800 | Desktop | 4 + thumb |
| TBS | 3D Terminal | Kiosk | 1 |
| Veridium | VeridiumID | Cellphone | 4 |

Despite the interesting applications of the contactless fingerprint recognition systems, identifying contactless fingerprints is a challenging problem. In an unconstrained scenario, a finger can be under varying environmental conditions such as different lighting conditions. These conditions often reduce the performance of the classical ridge enhancement and minutiae extraction methods. Therefore, some algorithms constrain the capturing setup to minimize the environmental variations. However, restricting the capturing configuration can critically limit the applications of the recognition system. In addition to the environmental variations, the perspective distortion introduced by the 3D geometry of the finger makes it more difficult to extract information from a contactless fingerprint using the classical algorithms. For instance, perspective distortion severely alters the range of the ridge frequencies. Consequently, the classical ridge enhancement methods fail to reconstruct the ridge map since they consider a smooth ridge frequency map with a small change around the fingerprint area.

As the amount of perspective distortion increases at a distance away from the center of the finger in the contactless fingerprint, several studies solely consider the central region of the fingerprint for the matching process. However, limiting the processing area within a fingerprint may decrease the matching accuracy. An alternative approach is to utilize the localized texture patterns called level zero features from the whole contactless fingerprint which can be extracted either directly, or indirectly by training a deep convolutional neural network (DCNN). A main limitation of these methods is the constrained interoperability of the algorithm since they cannot provide a semantic representation for a given contactless fingerprint that can be used for matching to fingerprint samples from various contact-based devices.

Rectifying the perspective distortion of the contactless fingerprints can increase the active area for the matching process and consequently can result in a higher matching accuracy. On the other hand, the rectified contactless fingerprint can represent a clean sample of a finger that is compatible for matching to legacy samples by extracting reliable minutiae. Several approaches have been proposed in the literature to address the elastic deformation of fingerprints introduced during the capturing process. Thin Plate Spline (TPS) and approximated TPS have been widely adopted to rectify the elastic distortion of fingerprints.

As previously discussed, the perspective distortion prevents the classical fingerprint enhancement algorithms from extracting reliable ridge information from areas which are far from the center of the contactless sample. Therefore, there is not enough supervision (ground truth parameters of the perspective distortion) to directly train a model to predict the parameters of the warp. In this study, a deep contactless fingerprint unwarping model that learns to estimate the distortion parameters of the contactless fingerprints without requiring a direct access to the ground truth distortion parameters.

Figure 1:
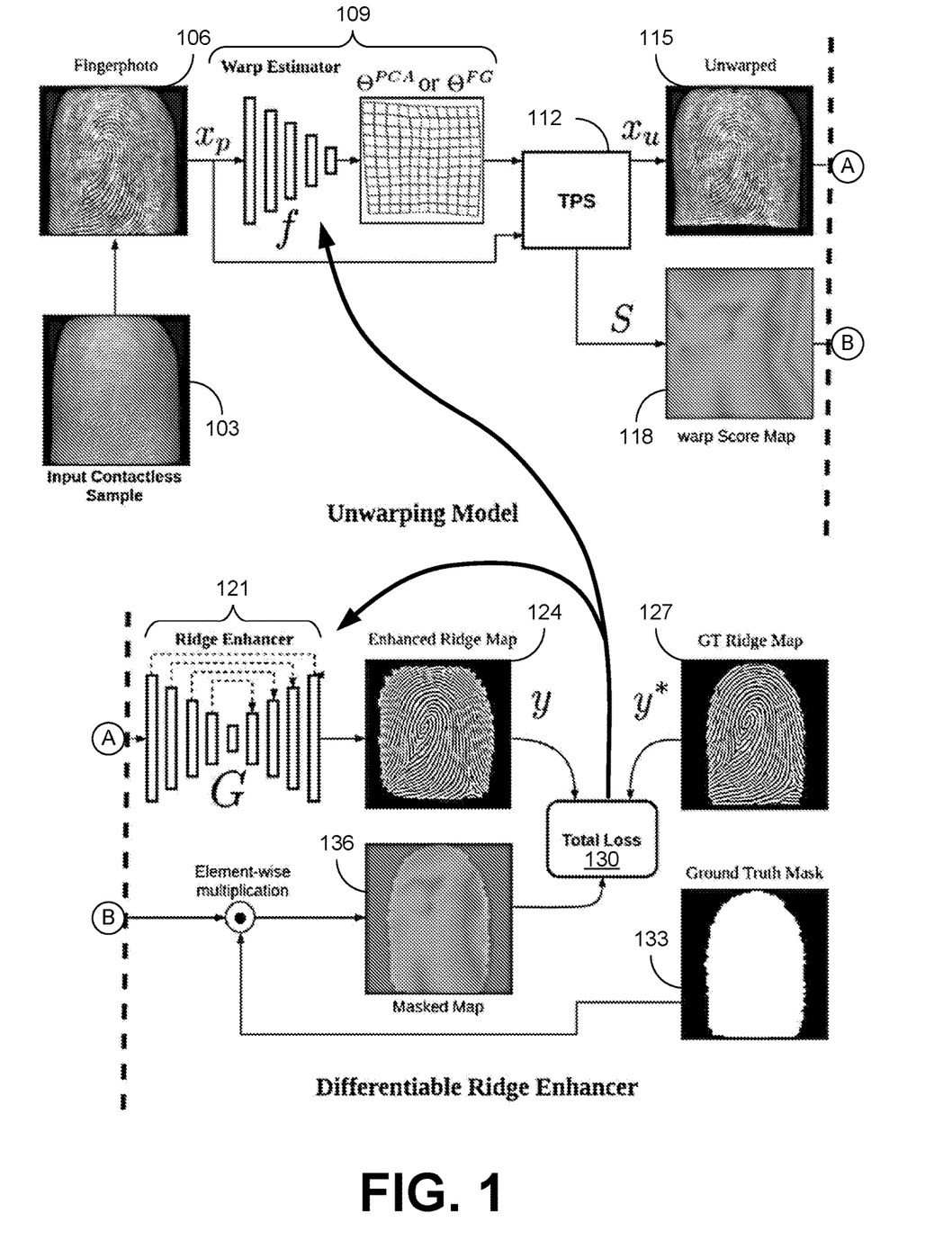
FIG. 1 illustrates an example of distortion rectification of contactless fingerprint samples comprising perspective distortion, in accordance with various embodiments of the present disclosure.

The model comprises two jointly optimized networks as shown in FIG. 1. The first network estimates the warp parameters that can geometrically map the input contactless fingerprint to its equivalent contact-based sample. The second network enhances the unwarped sample to extract the binarized ridge map of the corresponding contact-based fingerprint. A joint optimization framework can couple the two networks and indirectly learns the geometric mapping between the contactless fingerprint and its equivalent contact-based fingerprint. This disclosure presents:

A novel deep unwarping model which can rectify the perspective distortion of a contactless fingerprint, such that the binarized ridge map of the unwarped contactless fingerprint matches the ridge map of its corresponding contact-based fingerprint.

An end-to-end joint optimization framework which can solve the problem in a weakly supervised manner. In this way, there is no need for ground truth parameters of the distortion.

A differentiable ridge enhancer model which can reduce the environmental variations of contactless fingerprints and provide an indirect supervision for the unwarping model A novel statistical model of the perspective warp which can provide a more robust representation of the warp compared to conventional PCA-based models.

Two factors that contribute to the difference between contactless and contact-based fingerprints include the geometric distortion and the environmental conditions. First, both the contactless and contact-based fingerprints are geometrically distorted, and there is a non-linear spatial transformation between them. Second, variation of the environmental conditions (e.g., different lighting situations) is more severe in capturing contactless samples. To address the perspective distortion problem, a deep contactless fingerprint unwarping model is developed. In addition, a model to extract ridge information of the unwarped samples is developed. At the end, the whole model can be trained concurrently by the end-to-end joint optimization process.

Contactless Fingerprint Unwarping

Given an input contactless sample $x_p$ and the binarized ridge map of the equivalent contact-based fingerprint sample $x_b$, find the parameters $\Theta$ of a non-linear spatial transformation T such that unwarping $x_p$ using $T(., \Theta)$ results in a unwarped sample $x_u$ that has the maximum ridge overlap with $x_b$. The unwarped contactless sample can be formulated as:

$$x_u = T(x_p, \Theta) \quad (1)$$

To estimate the parameters of the warp, a non-linear function $f$ which takes the input contactless sample $x_p$ and estimates the set of parameters of warp $\Theta = f(x_p)$ can be used. A CNN for the choice off can be developed, and it can be trained using an end-to-end joint optimization which will be discussed in the end-to-end joint optimization section. Having the estimator $f$, Equation 1 can be rewritten as:

$$x_u = T(x_p, f(x_p)) \quad (2)$$

Define a statistical model to represent the perspective distortion (warp) of the contactless fingerprints. A fixed regular sampling grid $G_p$ on $x_p$ which contains N horizontal and M vertical nodes can be defined. The corresponding grid $G_u$ on the unwarped contactless sample is the result of transforming $G_p$ using $T(., \Theta)$. Therefore, all the parameters of the warp can be obtained using these two grids. Instead of estimating the parameters of the warp directly, the displacement between the nodes of $G_p$ and $G_u$ is estimated. Two warp models can be developed to estimate the displacements caused by the perspective distortion.

PCA-constrained Warp Model. One approach to model a warp is to use a set of training samples representing the source and the target keypoints. Minutiae points can be extracted from contactless samples and corresponding contact-based samples. For example, minutiae points were manually extracted from 400 contactless samples and the corresponding contact-based samples. Using sampling grid pairs, the warp can be modeled as a displacement of corresponding points on the original grid and the warped grid as follows:

$$d_i = v_i^u - v_i^p, \quad (3)$$

where $d_i$ is the displacement field of minutia for the ith pair of contactless and corresponding contact-based fingerprints, and $v_i^u$ and $v_i^p$ are the vectorized locations of all the points in grid $G_u$ and $G_p$ for the ith pairs of samples, respectively. Using PCA on the vectorized locations of all the training samples, the principal components of the displacement between the two modalities can be extracted. Approximation of the displacement fields using PCA is:

$$\hat{d} \approx \bar{d} + \sum_{i=1}^{t} c_i \sqrt{\lambda_i} e_i, \quad (4)$$

where $\bar{d}$ is the average displacement, t is the number of selected principal components for modeling the warp, $c_i$ is the coefficient of the corresponding eigenvector component, $e_i$ is the ith eigenvector and $\lambda_i$ is its corresponding eigenvalue. In this framework, the warp estimator $f$ can estimate the warp by predicting the coefficients of the most significant principal components of the warp $\Theta_{PCA} = \{c_i : i \in \{1, \ldots, t\}\}$ for an input contactless sample.

Free Grid Warp Model. Modeling the statistics of the warp using PCA is highly dependent on the number of samples that are used for extracting the principal components of the warp. To have a more robust and flexible model for the warp, a second warp model in which the warp parameters are directly defined as the displacement of each node in the target grid $G_u$ compared to $G_p$ can be developed. Therefore, the target outputs of the warp estimator $f$ for this model is $\Theta^{FG} = v_u - v_p$, where $v_u$ and $v_p$ are the vectorized locations of all points in grid $G_u$ and $G_p$.

Figure 2:
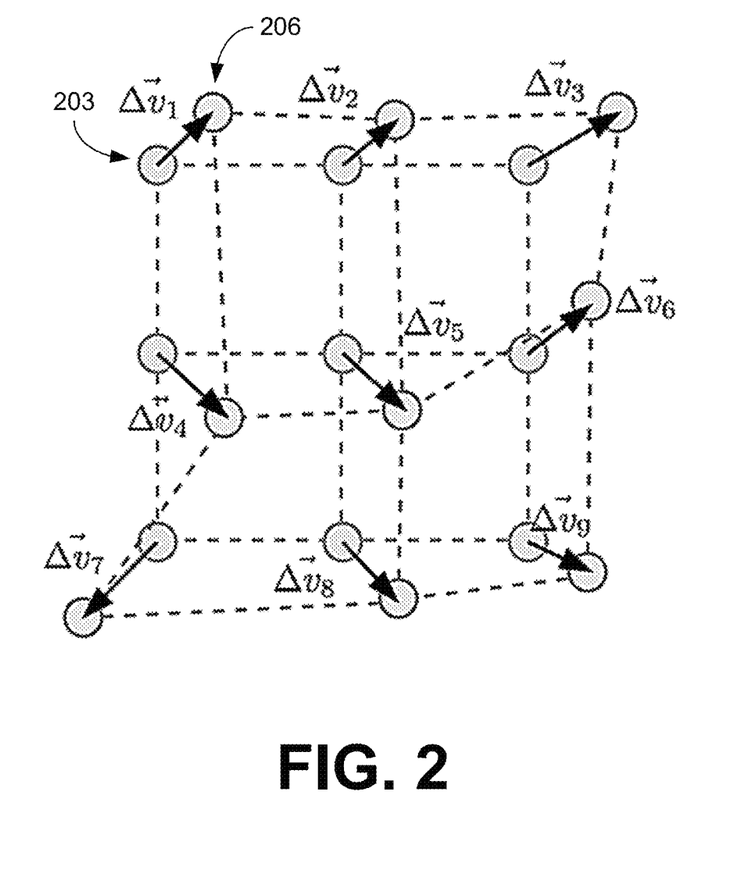
FIG. 2 illustrates an example demonstrating a free grid method for modeling warp, in accordance with various embodiments of the present disclosure.

FIG. 2 shows a simple demonstration of the free grid method for modeling the warp. A sample demonstration of the free grid model of size 3×3 is illustrated. A first array of nodes 203 denote the source grid and a second array of nodes 206 denote the target grid. In the free grid scenario for modeling the warp, the warp estimator estimates a displacement vector ($\Delta \vec{v}_n$) which comprises the difference between the locations of the source and target nodes.

Two warp models are proposed to represent the warp between the contactless and contact-based fingerprints. The parameters of the first warp are the coefficients of the PCA, referred to as $\Theta^{PCA}$. The parameters of the second warp are exactly the displacement of ridge information, referred to as $\Theta^{FG}$. Unfortunately, it is a difficult and labor-intensive task to extract minutiae from a contactless fingerprint (especially the marginal area of ridge information). Because of this, there is not enough supervision (minutiae-annotated pairs of contactless and contact-based fingerprints) for effective training of the deep CNN $f$. To overcome this issue, a second model can be developed that indirectly provides the supervision needed to train the warp estimator model.

Ridge Enhancement

Given an unwarped contactless sample $x_u$, a model can be developed to predict its ridge structure. For this purpose, one can adopt a classical ridge enhancement method (e.g., as in "On-line fingerprint verification" by A. Jain and L. Hong in *Pattern Recognition*, Proceedings of the 13th International Conference on, volume 3, pages 596-600. IEEE, 1996, which is hereby incorporated by reference in its entirety) which can perform band-pass filtering for enhancing the ridge information. However, due to the lack of supervision for training the unwarping model, a joint optimization problem is proposed where the unwarping model can use the indirect supervision provided by the ridge enhancement unit through backpropagation. Therefore, a differentiable ridge enhancement model can be developed so that the reconstruction loss can be used to update the parameters of the unwarping model.

A deep U-Net model can be adopted to predict the binarized ridge information of the unwarped contactless fingerprint. Given the unwarped sample $x_u$ with the size of w×h, the ridge enhancement model generates a binary map $y = G(x_u)$ of size w×h×2 where) $y^{(i,j,0)}$ and $y^{(i,j,1)}$ are the predictions of the network as the probability of the pixel at the location (i,j) in $x_u$ belonging to one of the classes of "background" or "ridge" respectively. In other words, this model is performing a dense binary classification for each pixel in the unwarped contactless fingerprint $x_u$.

End-to-End Joint Optimization

As discussed before, extracting minutiae from contactless fingerprints is a labor-intensive task, especially in the case of training a deep model where thousands of samples are needed to achieve reasonable performance. Without having the minutiae annotations, there is not enough supervision for training the unwarping model. However, the contact-based equivalents of the contactless fingerprints are available, and they can be used as the weak supervision for predicting the warp parameters. After enhancing the unwarped sample $x_u$, the final output of the model is a binarized ridge map as follows:

$$y = G(T(x_p, f(x_p))). \quad (5)$$

Let $y^*$ be the binarized ridge map of the contact-based fingerprint corresponding to the input sample $x_p$, and define the enhancement loss as the dense cross-entropy loss for all pixels in the output map as:

$$\mathcal{L}_{Enh} = \frac{-1}{wh} \sum_{i=0}^{w-1} \sum_{j=0}^{h-1} \sum_{k=0}^{1} y^{*(i,j,k)} \log y^{(i,j,k)}. \quad (6)$$

Due to the perspective distortion in contactless samples, ridge information in the center are clearer, and it is easier to reconstruct them. However, the goal is to unwarp and enhance the ridge information which are degraded because of the perspective distortion.

A score map can be developed that shows which parts of the input sample contain more perspective distortion. This score map can then be used to force the network to pay more attention to distorted areas rather than clear ridges. The transformation T in the contactless fingerprint unwarping model section performs a spatial transformation using the parameters estimated by the unwarping model. During the unwarping process, T transforms each source location u=(i,j) in the input contactless fingerprint to the target location u'=(i',j') in the unwarped version. These source and target locations can be used to estimate the amount of warp in each location of the input contactless fingerprint. A warp score map S can be defined as:

$$S = \{s_{i,j} = \sqrt{(i-i')^2 + (j-j')^2} : \forall (i,j) \in \{1 \ldots w\} \times \{1 \ldots h\}\}, \quad (7)$$

where $s_{i,j}$ shows the amount of warp at the location (i,j) in the input sample. Normalize S such that $s_{i,j \in [\alpha, 1]}$ as:

$$\hat{S} = \alpha + (1-\alpha) \frac{S - \min\{S\}}{\max\{S\} - \min\{S\}}. \quad (8)$$

Finally, using the normalized score map $\hat{S}$, Equation 6 can be rewritten as:

$$\mathcal{L}_{Enh} = \frac{-1}{wh \sum_{i=0}^{w-1} \sum_{j=0}^{h-1} \hat{s}_{i,j}} \times \sum_{i=0}^{w-1} \sum_{j=0}^{h-1} \hat{s}_{i,j} \sum_{k=0}^{1} y^{*(i,j,k)} \log y^{(i,j,k)}. \quad (9)$$

Stochastic gradient descent can be used to minimize $\mathcal{L}_{Enh}$. During the training, the error of the ridge segmentation backpropagates to update the parameters of the ridge enhancer and the warp estimator network. It may be noted that the geometric transformer T is a differentiable TPS which allows the gradients of the loss to be backpropagated to the warp estimator network. Therefore, the deep warp estimator can update its parameters without any direct knowledge about the ground truth parameters of the actual warp.

Network Architecture

The disclosed technology is designed to match contactless (touchless) fingerprints against contact-based fingerprints. FIG. 1 illustrates an example of the overall processing to rectify perspective distortion and facilitate the cross-matching utilizing two jointly optimized networks. An input contactless sample 103 can be preprocessed to generate a preprocessed contactless sample $x_p$ (fingerphoto) 106, which can be supplied to the warp estimator 109. After preprocessing the input contactless sample 103, the warp estimator 109 predicts the parameters of the warp. A non-linear function $f$ can be used to estimate the set of parameters of warp $\Theta = f(x_p)$. A DCNN can be utilized for the non-linear function by being trained to estimate the warp parameters. It can predict the deformation based on either a PCA-constrained model of warp and/or a free grid model of warp. Using the estimated warp parameters ($\Theta^{PCA}$ or $O^{FG}$), the TPS 112 can generate the unwarped contactless sample $x_u$ 115 from the contactless sample $x_p$ through an appropriate geometric transformation. The TPS 112 can also provide a warp score map S 118 based upon the source and target locations. The score map illustrates which parts of the input sample contain more perspective distortion.

The ridge enhancer 121 performs a ridge segmentation on the unwarped sample 115 to produce the binarized ridge map 124 for the corresponding contact-based fingerprint. The ridge enhancer 121 generates a binary map $y=G(x_u)$ based upon the predicted probabilities of the pixels belonging to a "background" or "ridge" class. The enhanced ridge map 124 can be used for fingerprint identification. A DCNN can be trained to achieve the ridge mapping function. The final ridge map y 124 can be compared to the ground truth (GT) ridge map y* 127 of the corresponding contact-based fingerprint to provide supervision for updating the training of the ridge enhancer 121 and/or the warp estimator 109. The total reconstruction loss 130 can be used to update training of the DCNN for the parameters of the unwarping model and/or the ridge enhancement model. The warp score map S 118 can then be used to weight the distorted or warped areas of the total loss 130. The score map 118 can be combined (e.g., element-wise multiplication) with a ground truth map 133 of the corresponding contact-based fingerprint to generate a masked score map 136 for use with the total loss 130.

As indicated, the model of FIG. 1 comprises two DCNNs. The first network acts as a non-linear regression model which estimates the continuous parameters of the warp. The number of outputs, $N_o$, of the warp estimator depends on the type of the warp model defined in the PCA-constrained and free grid warp model sections. For the choice of PCA-constrained model, the number of outputs was set $N_o=4$ as the model estimates the coefficients for the top four significant eigen vectors of the warp. For the choice of the free grid warp model, the number of outputs was set $N_o=200$, and the model estimates the displacement of a grid with the size of 10×10 along two axes. The table of FIG. 3 details the structure of the warp estimator and ridge enhancer networks.

Figure 3:
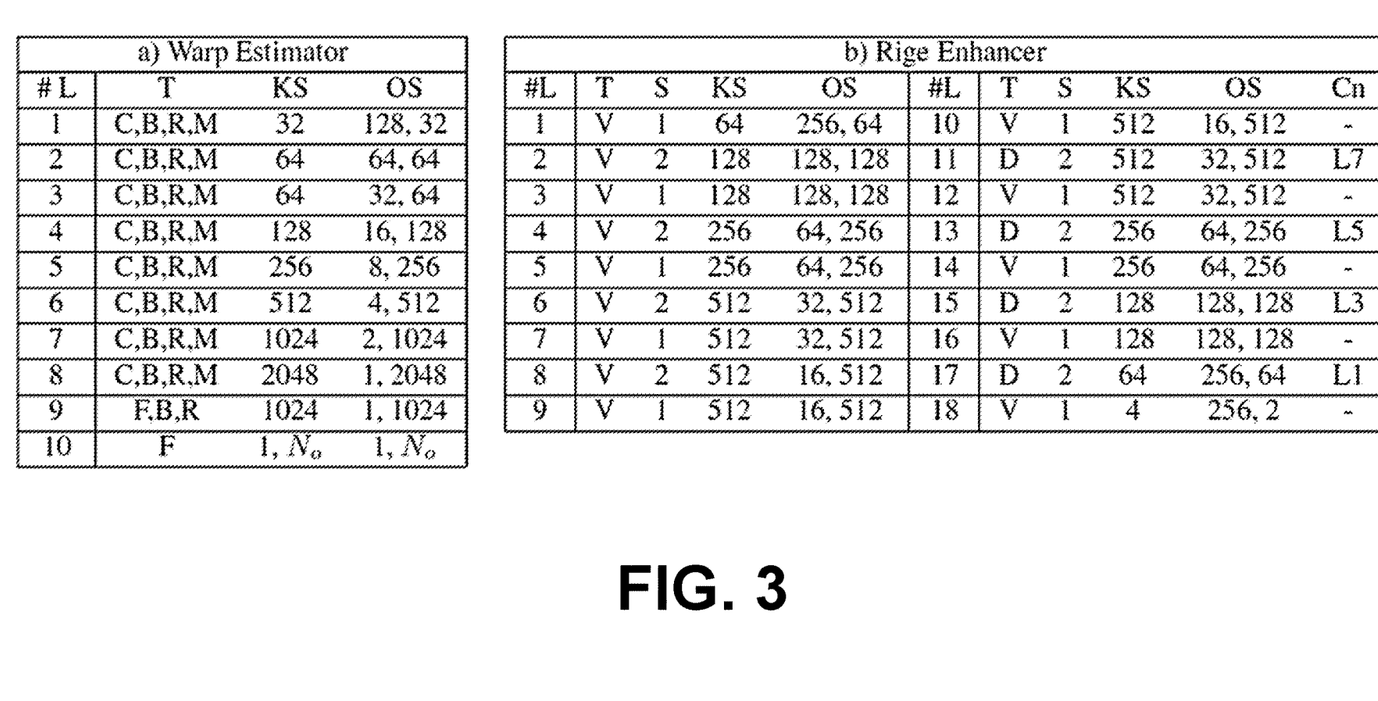
FIG. 3 includes tables illustrating examples of the architecture of a warp estimator and a ridge enhancer of FIG. 1, in accordance with various embodiments of the present disclosure.

The table (a) of FIG. 3 illustrates the architecture of the warp estimator, and table (b) of FIG. 3 illustrates the architecture of the ridge enhancer. In the example of FIG. 3, all layers of the warp estimator are formed by combining convolution (C), batch normalization (B), ReLU (R), max pooling (M), and fully-connected (F) modules. The spatial size of all kernels of the warp estimator are 3. The stride for all convolutions is 1. $N_o$ is the number of outputs as discussed above. In the example of FIG. 3, each layer of the ridge enhancer is either a convolution block V={C, B, R} or a deconvolution block D={Transposed Convolution, B, R}. The number of kernels is denoted by 'KS', and the output size of each layer is denoted by 'OS'. Layers 1, 3, 5, and 7 of the ridge enhancer are concatenated to layers 17, 15, 13, and 11, respectively.

Experiments

Four test models were defined to investigate the role of the warp models and the warp score map. The table of FIG. 4 details these models to investigate the role of different warp models and the warp score map in the total performance of the model. To evaluate the proposed method, two publicly available datasets of ManTech and 2D/3D were used. The ManTech dataset contains contactless and contact-based fingerprints from all fingers of 496 subjects. For each finger, 2 contactless fingerprints and several contact-based fingerprints captured using different sensors are available. All of the 9,920 contactless samples and their corresponding contact-based samples were used for training the four test models. The 2D/3D dataset has been published recently and contains 9,000 samples from 1,500 fingers. For each finger two contactless and 4 contact-based samples are available. Samples from 500 fingers were used for fine-tuning the test models trained on the ManTech dataset, and the rest of the dataset was used for testing the model.

All the samples were preprocessed to reduce the variations of fingerprints. Finger regions were first segmented in all contactless samples by thresholding. Then the ridge information was enhanced using adaptive histogram equalization. The scale and rotation of samples were fixed and normalized using their median ridge frequency and orientation. For contact-based fingerprints, the median was computed over the whole area, and for contactless fingerprints, the median was computed over the central area of the fingerprint sample occupying 40 percent of the total ridge area. All samples were scaled to have a median ridge interval of 10 pixels. The final size of all samples was scaled to 256×256 which was the default spatial size of the input for the model.

Several experiments were conducted to evaluate the proposed method using the experimental setup defined in by generating 8,000 (1,000×2×4) genuine and 7,992,000 (1,000×999×4×2) imposter pairs from the 2D/3D dataset. The disclosed approach was compared to several methods in the literature. In experiments 1 to 3, raw contactless and contact-based fingerprints are matched directly without performing any unwarping process or enhancing (without any rectification) using the NIST-NBIS, VeriFinger, and MCC methods. In experiments 4 to 7, the previously proposed methods of approximating TPS, deep fingerprint rectification, and robust TPS were used to rectify contact-based fingerprints for elastic deformation and match them to contactless samples. In experiments 4 to 6, contact-based fingerprints were rectified for elastic deformation before the matching. In experiment 7, a Siamese model was implemented to match contact-based fingerprints against the contactless samples. The samples were matched using the trained Siamese network. It should be noted that contrary to the previous approaches, the contactless fingerprints are unwarped rather than rectifying contact-based fingerprints. In the disclosed approach, the contactless samples are first unwarped and then matched to the contact-based fingerprints. Experiments 8 to 11 shows the performance of the four test models of FIG. 4. In these last four experiments, the unwarped and enhanced contactless fingerprints were matched using the four variations of the disclosed model against contact-based fingerprints. The VeriFinger 7.0 standard SDK was used as the matcher at the top of the algorithms.

Figure 5A:
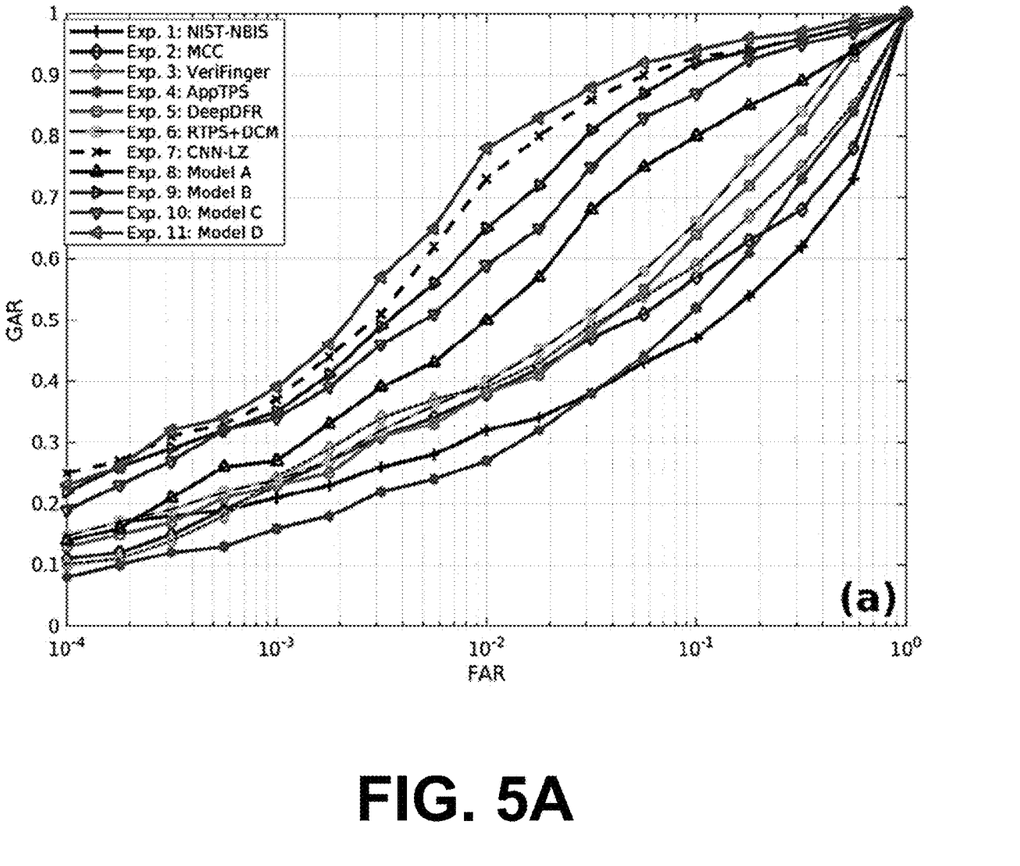
FIGS. 5A and 5B are plots illustrating ROC and CMC curves for cross-matching experiments, in accordance with various embodiments of the present disclosure.
Figure 5B:
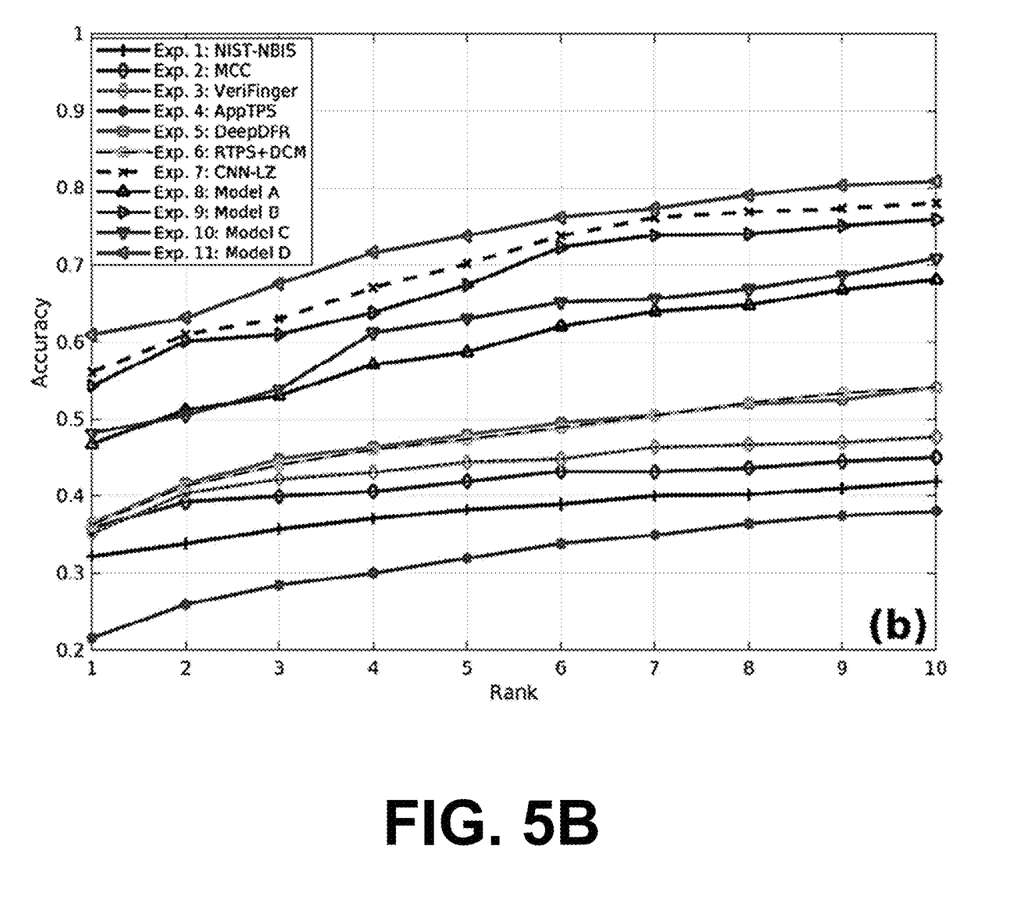
Figure 7:
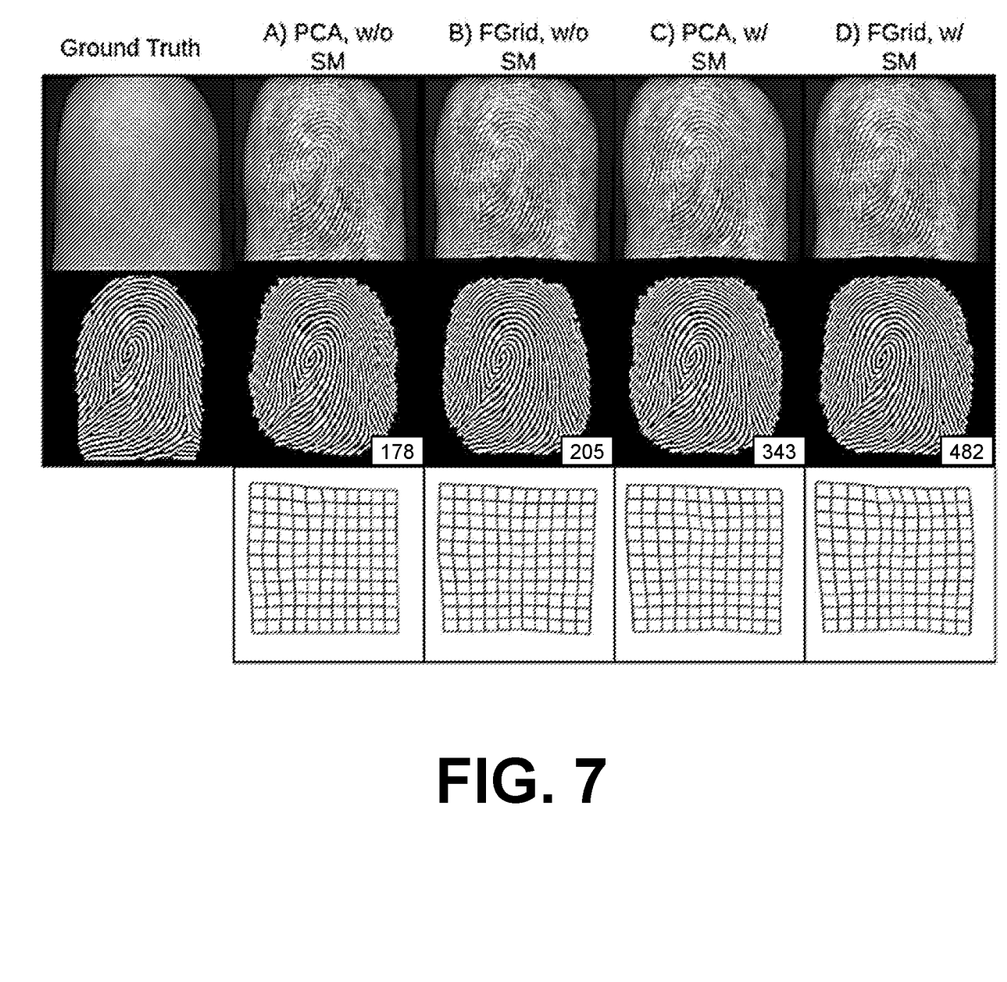
FIG. 7 illustrates examples of outputs of the four models of FIG. 4, in accordance with various embodiments of the present disclosure.

For each experiment, the performance of a method was measured using Receiver Operating Characteristics (ROC) and Cumulative Matching Characteristic (CMC) curves which are plotted in FIGS. 5A and 5B respectively. The table of FIG. 6 shows the equal error rate and Rank-1, Rank-5, and Rank-10 accuracy for all experiments. According to the experiments, it was observed that the free grid warp model outperforms the PCA warp model developed for rectifying the elastic deformation of contact-based fingerprints. On the other hand, we observe that the warp score map defined in Equation 7 significantly helps the ridge enhancement network to pay more attention to the unwarped areas, and as a result, indirectly provides more robust supervision for the warp estimator network. FIG. 7 provides a visual comparison of the results obtained from all four test models. The top row shows the ground truth contactless fingerprint and its unwarped versions. The middle row shows the ground truth ridge map and the final outputs of the four models. The score in the middle row (lower right corners) shows the matching score between the ridge map and the ground truth obtained using VeriFinger. The bottom row shows the estimated warps for each model.

Figure 4:
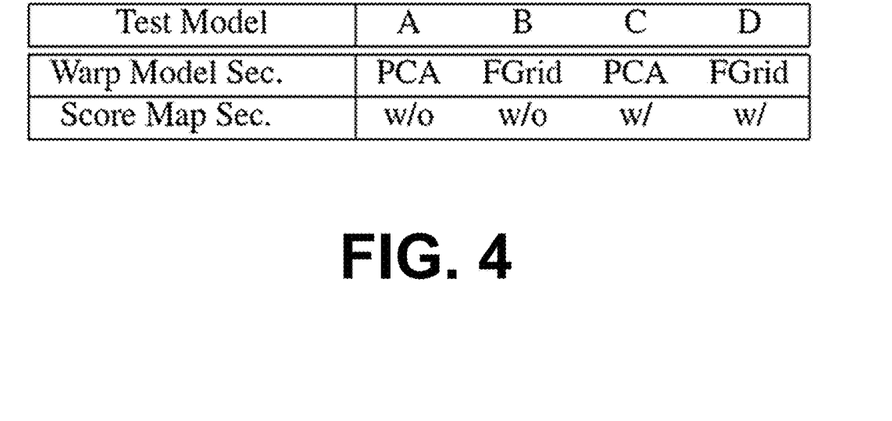
FIG. 4 is a table illustrating examples of models utilized to test distortion rectification, in accordance with various embodiments of the present disclosure.
Figure 8:
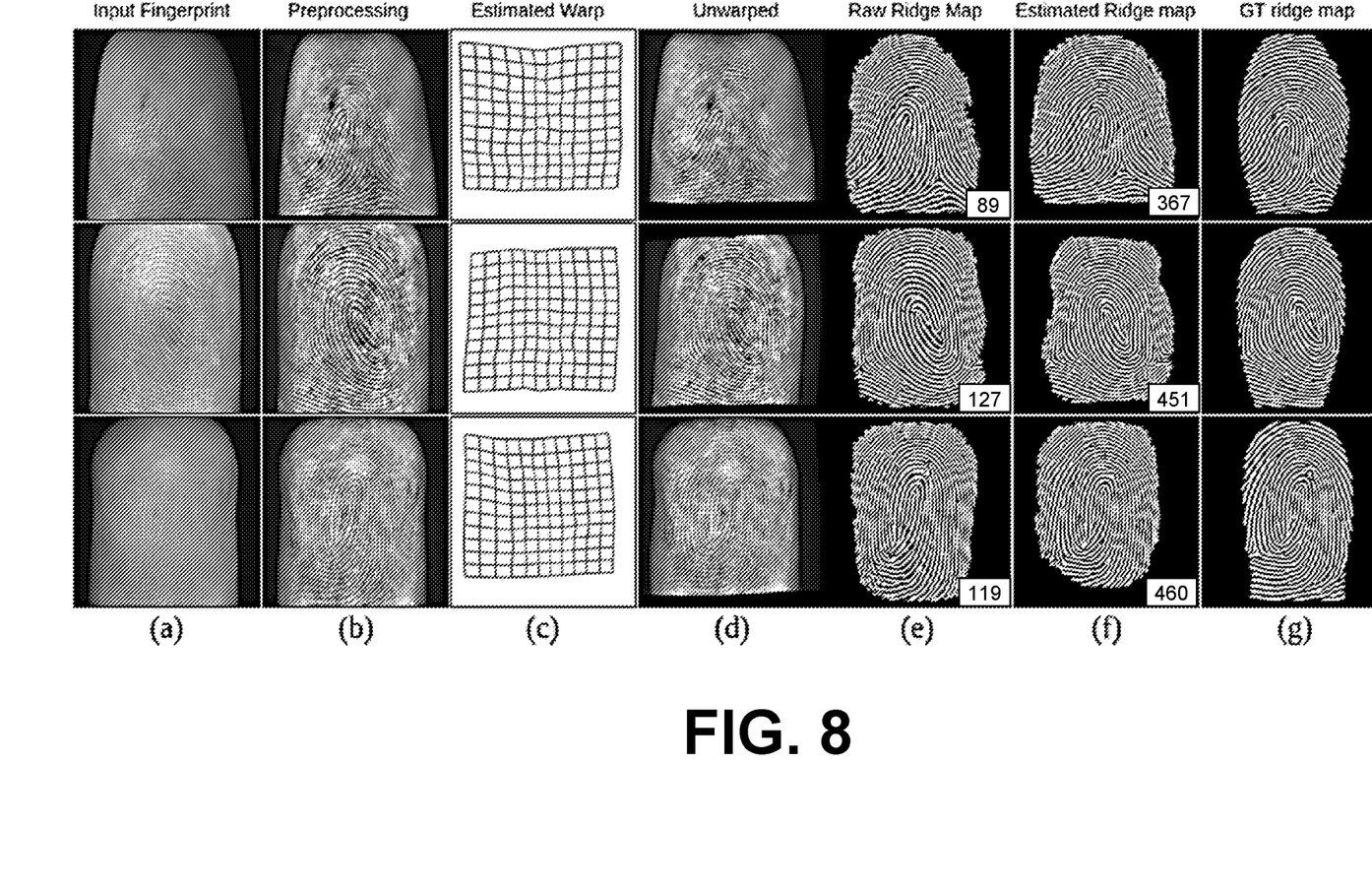
FIG. 8 illustrates examples of fingerprint samples using the distortion rectification of FIG. 1, in accordance with various embodiments of the present disclosure.

Model 'D' of FIG. 4, which utilizes the free grid warp model and the warp score map, was selected as the superior model of this study due to its significant performance compared to other three models. FIG. 8 shows some examples processed by this model. Columns from left to right illustrate: (a) the input contactless fingerprints, (b) the input samples after initial enhancement by adaptive histogram equalization, (c) the deformation grid estimated using the final model (model D), (d) unwarped contactless fingerprints, (e) the ridge maps extracted directly from the unwarped samples using Gabor filtering, (f) ridge maps estimated by the proposed ridge enhancer model, and (g) the ground truth (GT) ridge maps obtained from contact-based fingerprints. The values (lower right corners) show the VeriFinger matching score of the corresponding ridge map to the ground truth ridge map.

Figure 9:
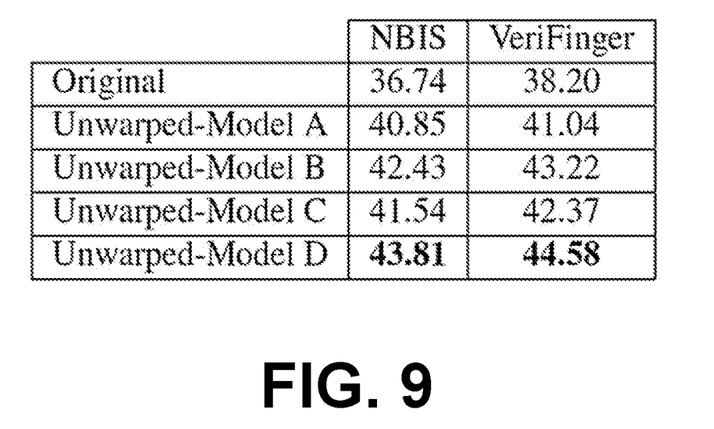
FIG. 9 is a table illustrating examples of average number of minutiae extracted from contactless fingerprint samples before and after the distortion rectification of FIG. 1, in accordance with various embodiments of the present disclosure.

In another experiment, the number of minutiae detected by the NIST-NBIS and VeriFinger were measured. The table of FIG. 9 shows the number of minutiae extracted from the unwarped contactless fingerprints. This shows that unwarping the contactless fingerprint can reveal some valuable information from the distorted or warped part of the sample (average number of minutiae extracted from contactless fingerprints before and after the unwarping process). More specifically, samples unwarped with model 'D' contain approximately 17% more minutiae compared to the original contactless fingerprints.

Figure 10:
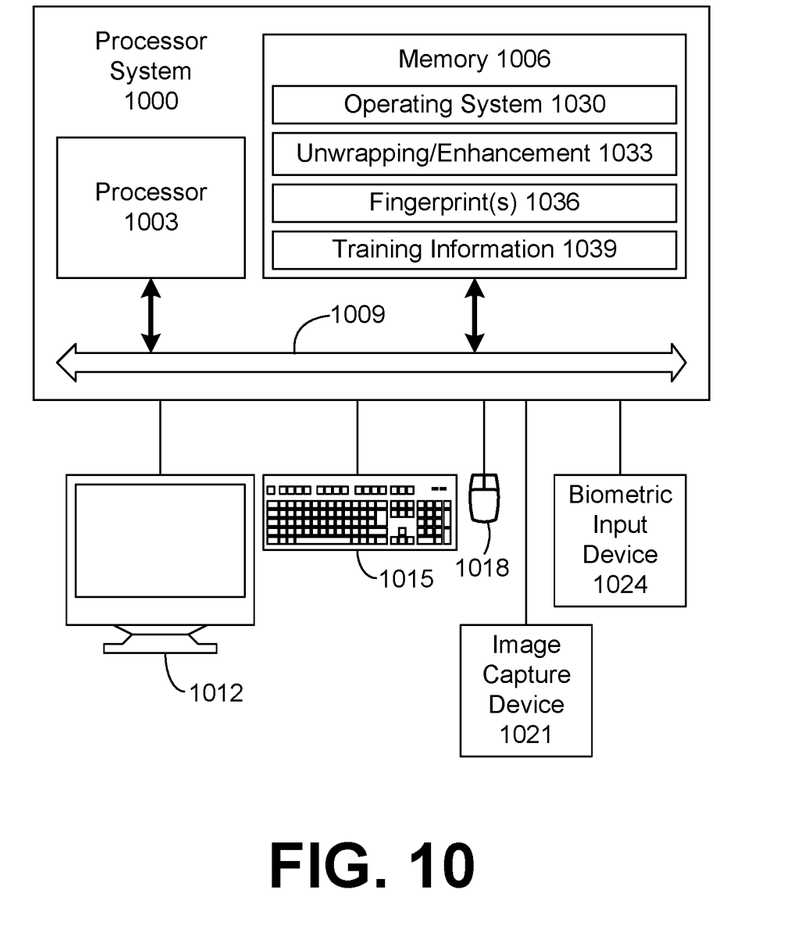
FIG. 10 is a schematic block diagram of one example of a system employed for fingerprint distortion rectification, in accordance with various embodiments of the present disclosure.

Referring next to FIG. 10, shown is one example of a system that performs various functions for fingerprint unwarping and ridge enhancement according to the various embodiments as set forth above. As shown, a processor system 1000 is provided that includes processing circuitry having, e.g., a processor 1003 and a memory 1006, both of which are coupled to a local interface 1009. The local interface 1009 may be, for example, a data bus with an accompanying control/address bus as can be appreciated by those with ordinary skill in the art. The processor system 1000 may comprise, for example, a computer system such as a server, desktop computer, laptop, smartphone, tablet, personal digital assistant, or other system with like capability.

Coupled to the processor system 1000 can be various peripheral devices such as, for example, a display device 1012, a keyboard 1015, and a mouse 1018. In addition, other peripheral devices that allow for the capture of various patterns may be coupled to the processor system 1000 such as, for example, an image capture device 1021, or a biometric input device 1024. The image capture device 1021 may comprise, for example, a digital camera or other such device that generates images that comprise patterns to be analyzed as described above. Also, the biometric input device 1024 may comprise, for example, a fingerprint input device, optical scanner, or other biometric device as can be appreciated.

Stored in the memory 1006 and executed by the processor 1003 are various components that provide various functionality according to the various embodiments of the present invention. In the example embodiment shown, stored in the memory 1006 is an operating system 1030 and a fingerprint unwarping and ridge enhancement application 1033 that utilizes DCCNs. In addition, stored in the memory 1006 are various fingerprint(s) 1036 and various training information 1039. The training information 1039 can comprise, e.g., warping parameters and/or contactless fingerprints associated with corresponding contact-based fingerprint(s) 1036. The fingerprint(s) 1036 and the training information 1039 may be stored in a database to be accessed by the other systems as needed. The fingerprint(s) 1036 can comprise fingerprint images or other patterns as can be appreciated. The fingerprint(s) 1036 can comprise, for example, a digital representation of physical patterns or digital information such as data, etc.

The fingerprint unwarping and ridge enhancement application 1033 can be executed by the processor 1003 in order to generate a rectified fingerprint as described above. A number of software components can be stored in the memory 1006 and can be executed by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, or source code that may be expressed in proper format such as object code that is capable of being loaded into a of random access portion of the memory 606 and executed by the processor 1003, etc. An executable program may be stored in any portion or component of the memory 1006 including, for example, random access memory, read-only memory, a hard drive, compact disk (CD), floppy disk, or other memory components.

The memory 1006 is defined herein as both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

The processor 1003 may represent multiple processors and the memory 1006 may represent multiple memories that operate in parallel. In such a case, the local interface 609 may be an appropriate network that facilitates communication between any two of the multiple processors, between any processor and any one of the memories, or between any two of the memories etc. The processor 1003 may be of electrical, optical, or molecular construction, or of some other construction as can be appreciated by those with ordinary skill in the art.

The operating system 1030 is executed to control the allocation and usage of hardware resources such as the memory, processing time and peripheral devices in the processor system 1000. In this manner, the operating system 1030 serves as the foundation on which applications depend as is generally known by those with ordinary skill in the art.

Although the fingerprint unwarping and ridge enhancement application 1033 can be embodied in software or code executed by general purpose hardware, as an alternative the same may also be embodied in dedicated hardware or a combination of software/general purpose hardware and dedicated hardware. If embodied in dedicated hardware, the fingerprint unwarping and ridge enhancement application 1033 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flowchart of FIG. 1 shows the architecture, functionality, and operation of an implementation of the fingerprint unwarping and ridge enhancement application 1033. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although flowchart of FIG. 1 shows a specific order of execution, it is understood that the order of execution may differ from that which is depicted. For example, the order of execution of two or more blocks may be scrambled relative to the order shown. Also, two or more blocks shown in succession in FIG. 1 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the fingerprint unwarping and ridge enhancement application 1033 may comprise software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the fingerprint unwarping and ridge enhancement application 1033 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

In this disclosure, a technical approach is proposed to unwarp the contactless fingerprints to reduce the spatial mismatch introduced by the perspective distortion and recover information from severely distorted parts of the contactless samples. One issue faced when rectifying the perspective distortion is the lack of enough minutia-annotated pairs of contactless and the corresponding contact-based fingerprints. To overcome this hurdle, a deep contactless fingerprint unwarping model is presented which indirectly learns to unwarp contactless fingerprints without having any supervision for the desired warp parameters. The warp estimator model learns to unwarp the input contactless fingerprint such that the unwarp sample has enough overlap with its corresponding contact-based fingerprint. The overlapping information of the unwarped contactless fingerprint can be computed by the second model, a differentiable ridge enhancer, and the error of alignment can be used to update the parameters of both models simultaneously. The performance of the proposed model was evaluated on two public datasets of contactless fingerprints and was compared to several state-of-the-art methods for rectifying fingerprint distortion. Extensive experiments showed that, on average, the proposed model can recover 17% more minutiae from the contactless fingerprints compared to the raw samples.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method for rectifying contactless fingerprint perspective distortion, comprising:
    selecting an electronic, perspective distorted fingerprint sample;
    generating an unwarped fingerprint sample by rectifying perspective distortions from the electronic, perspective distorted fingerprint sample by application of an unwarping transformation, where parameters of the unwarping transformation are determined by a deep convolutional neural network (DCNN) trained on a database comprising contactless fingerprint samples suffering from perspective distortions; and
    generating a warp score map corresponding to the unwarped fingerprint sample, the warp score map indicating an amount of warp at each source location of the electronic, perspective distorted fingerprint sample.

2. The method of claim 1, wherein the database comprises contact-based fingerprint samples suffering from geometric distortion, at least one contact-based fingerprint sample corresponding to individual ones of the contactless fingerprint samples, and wherein the DCNN is trained on the contactless fingerprint samples and the corresponding contact-based fingerprint samples.

3. The method of claim 1, wherein the DCNN is trained to determine the parameters of the unwarping transform based upon a PCA-constrained model of warp.

4. The method of claim 1, wherein the DCNN is trained to determine the parameters of the unwarping transform based upon a free grid model of warp.

5. The method of claim 1, wherein the unwarping transformation is a thin plate spline (TPS) transformation.

6. The method of claim 1, wherein one source of the perspective distortions results from a touchless camera photograph of a fingerprint.

7. A method for rectifying contactless fingerprint perspective distortion, comprising:
    selecting an electronic, perspective distorted fingerprint sample;
    generating an unwarped fingerprint sample by rectifying perspective distortions from the electronic, perspective distorted fingerprint sample by application of an unwarping transformation, where parameters of the unwarping transformation are determined by a deep convolutional neural network (DCNN) trained on a database comprising contactless fingerprint samples suffering from perspective distortions; and
    generating an enhanced ridge map from the unwarped fingerprint sample, the enhanced ridge map generated utilizing a convolutional neural network (CNN) based ridge enhancer.

8. The method of claim 7, comprising identifying a relationship between the electronic, perspective distorted fingerprint sample and a contact-based fingerprint based upon a comparison of the enhanced ridge map with the contact-based fingerprint.

9. The method of claim 7, comprising determining a reconstruction loss associated with the enhanced ridge map based upon comparison of the enhanced ridge map and a ground truth ridge map associated with a contact-based fingerprint corresponding to the electronic, perspective distorted fingerprint sample.

10. The method of claim 9, wherein the reconstruction loss is provided for supervised training of the DCNN for determining the parameters of the unwarping transformation.

11. The method of claim 10, wherein the reconstruction loss is weighted based upon a warp score map corresponding to the unwarped fingerprint sample, the warp score map indicating an amount of warp at each source location of the electronic, perspective distorted fingerprint sample.

12. The method of claim 11, wherein the reconstruction loss is weighted based upon a masked score map generated from the warp score map based upon a ground truth map of the corresponding contact-based fingerprint.

13. The method of claim 7, wherein the DCNN is trained to determine the parameters of the unwarping transform based upon a free grid model of warp.

14. The method of claim 7, wherein the unwarping transformation is a thin plate spline (TPS) transformation.

15. A system, comprising:
    processing circuitry comprising a processor and memory; and
    a fingerprint unwarping and ridge enhancement application executable by the processing circuitry, where execution of the fingerprint unwarping and ridge enhancement application causes the processing circuitry to:
        identify warp parameters associated with a contactless fingerprint sample, the warp parameters estimated from the contactless fingerprint sample by a deep convolutional neural network (DCNN) trained on a database comprising contactless fingerprint samples suffering from perspective distortions; and generate an unwarped fingerprint sample from the contactless fingerprint sample, the unwarped fingerprint sample generated using an unwarping transformation based upon the identified warp parameters; and wherein a distortion rectification application causes the processing circuitry to generate an enhanced ridge map from the unwarped fingerprint sample utilizing a convolutional neural network (CNN) based ridge enhancer.

16. The system of claim 15, wherein the warp parameters are PCA-constrained warp parameters ($\Theta^{PCA}$) or free grid warp parameters ($\Theta^{FG}$).

17. The system of claim 15, wherein the unwarping transformation is a thin plate spline (TPS) transformation.

18. The system of claim 15, wherein supervised training of the DCNN is provided based upon a reconstruction loss based upon comparison of the enhanced ridge map and a ground truth ridge map associated with a contact-based fingerprint corresponding to the contactless fingerprint sample.

19. The system of claim 18, wherein the reconstruction loss is weighted based upon a warp score map corresponding to the unwarped fingerprint sample, the warp score map indicating an amount of warp at each source location of the contactless fingerprint sample.

20. The system of claim 15, wherein the contactless fingerprint is obtained by the system via an imaging device.

* * * * *